(12) United States Patent
Huang et al.

(10) Patent No.: US 12,196,998 B2
(45) Date of Patent: Jan. 14, 2025

(54) LIGHT SOURCE DEVICE INCLUDING ENHANCEMENT LAYER AND DISPLAY INCLUDING THE SAME

(71) Applicant: E Ink Holdings Inc., Hsinchu (TW)

(72) Inventors: Hsin-Tao Huang, Hsinchu (TW); Yu-Chuan Wen, Hsinchu (TW); Jen-Pin Yu, Hsinchu (TW); Ching-Huan Liao, Hsinchu (TW); Ya-Chin Chang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/341,767

(22) Filed: Jun. 27, 2023

(65) Prior Publication Data

US 2024/0134107 A1   Apr. 25, 2024
US 2024/0230976 A9   Jul. 11, 2024

Related U.S. Application Data

(60) Provisional application No. 63/419,302, filed on Oct. 25, 2022.

(30) Foreign Application Priority Data

Dec. 12, 2022   (TW) .................................. 111147549

(51) Int. Cl.
    *F21V 8/00*   (2006.01)
(52) U.S. Cl.
    CPC .................................. *G02B 6/0053* (2013.01)

(58) Field of Classification Search
    CPC ............ B32B 17/105041; B32B 27/08; B32B 2255/10; B32B 2255/24;
    (Continued)

(56) References Cited

U.S. PATENT DOCUMENTS 9,664,946 B2    5/2017  Kim et al.
2014/0125601 A1*  5/2014  Chen ....................... G06F 3/041
                                                    345/173

(Continued)

FOREIGN PATENT DOCUMENTS

CN    106873241     6/2017
TW    201419062     5/2014
TW    202041900    11/2020

*Primary Examiner* — Keith G. Delahoussaye
(74) *Attorney, Agent, or Firm* — JCIPRNET (57) ABSTRACT

A light source device includes a light guide plate, an optical adhesive, and a light source element. The light guide plate includes a light guide substrate and an enhancement layer. The light guide substrate has a light incident surface, a first surface, and a second surface. The first surface is opposite to the second surface, and the light incident surface extends between the first surface and the second surface. The enhancement layer is disposed on the light guide substrate. A thickness of the enhancement layer is from 1 micrometer to 25 micrometers and a first refractive index of the light guide substrate is greater than a second refractive index of the enhancement layer. The optical adhesive is interposed between the first surface of the light guide substrate and the optical adhesive. The light source element is disposed beside the light incident surface to emit light toward the light incident surface.

18 Claims, 4 Drawing Sheets

(58) Field of Classification Search
CPC ...... B32B 2307/7376; B32B 2307/418; B32B 2551/00; G02B 6/0023; G02B 6/005; G02B 6/0053; G02B 6/0063; G02B 6/0065; G02B 6/0093
USPC .................................................. 362/618.622
See application file for complete search history.

(56) References Cited

U.S. PATENT DOCUMENTS

| | | | |
|---|---|---|---|
| 2016/0111678 A1* | 4/2016 | Lee | C09J 9/00 257/40 |
| 2016/0202408 A1 | 7/2016 | Wang | |
| 2016/0291238 A1* | 10/2016 | Tai | G02F 1/13338 |
| 2016/0291404 A1 | 10/2016 | Kim et al. | |
| 2016/0342374 A1 | 11/2016 | Wang | |
| 2019/0056547 A1* | 2/2019 | Hwang | G02B 6/0023 |
| 2019/0107755 A1 | 4/2019 | Chen | |
| 2021/0003766 A1* | 1/2021 | Rinko | G02B 6/0023 |

* cited by examiner

LIGHT SOURCE DEVICE INCLUDING ENHANCEMENT LAYER AND DISPLAY INCLUDING THE SAME

CROSS-REFERENCE TO RELATED APPLICATION

This application claims the priority benefits of US provisional application Ser. No. 63/419,302, filed on Oct. 25, 2022, and Taiwan application serial no. 111147549, filed on Dec. 12, 2022. The entirety of each of the above-mentioned patent applications is hereby incorporated by reference herein and made a part of this specification.

BACKGROUND

Technical Field

The disclosure relates to an electronic device, and particularly relates to a light source device and a display.

Description of Related Art

Displays have been widely used in various devices and fields. Therefore, the design of displays faces various problems due to different applications and needs to be further improved. Taking the light source device in a display as an example, in order to provide a uniform light source, the light source device requires a light guide plate for guiding light distribution. In some applications, if the product is required to be flexible or used in a non-planar environment, the light guide plate also needs to overcome the damage caused by bending. Thus, the display components never stop improving.

SUMMARY

The disclosure provides a light source device with water resistance, ultraviolet (UV) resistance, chemical resistance, scratch resistance, and self-repair properties.

The disclosure provides a display that has good adhesion between elements and is less likely to be damaged.

A light source device according to an embodiment of the disclosure includes a light guide plate, an optical adhesive, and a light source element. The light guide plate includes a light guide substrate and an enhancement layer. The light guide substrate has a light incident surface, a first surface, and a second surface. The first surface is opposite to the second surface, and the light incident surface extends between the first surface and the second surface. The enhancement layer is disposed on the light guide substrate. A thickness of the enhancement layer is from 1 micrometer to 25 micrometers, and a first refractive index of the light guide substrate is greater than a second refractive index of the enhancement layer. The optical adhesive is disposed on the light guide substrate. The enhancement layer is interposed between the first surface of the light guide substrate and the optical adhesive. The light source element is disposed beside the light incident surface and emits light toward the light incident surface.

In an embodiment of the disclosure, the enhancement layer further covers the light incident surface, and the enhancement layer is interposed between the light incident surface and the light source element.

In an embodiment of the disclosure, the enhancement layer further covers the second surface.

In an embodiment of the disclosure, a third refractive index of the optical adhesive is greater than the second refractive index of the enhancement layer.

In an embodiment of the disclosure, the second refractive index of the enhancement layer is from 1.3 to 1.48.

In an embodiment of the disclosure, a material of the enhancement layer is a photo-crosslinkable resin.

In an embodiment of the disclosure, a material of the enhancement layer is selected from an acrylate polymer, a block polymer, an oligomer, a polymer or a hyperbranched polymer with a fluoroacrylate resin, a silicone modified oligomer, polymer or hyperbranched polymer, an acrylated epoxy resin, acrylated urethanes, aliphatic acrylated urethanes, aromatic acrylated urethanes, or combinations thereof.

In an embodiment of the disclosure, a material of the enhancement layer includes a monomer having a monofunctional group or a multifunctional group.

In an embodiment of the disclosure, the monomer is selected from a monofunctional or polyfunctional acrylate monomer; a fluoroacrylate monomer; a silicon modified acrylate monomer; or combinations thereof.

In an embodiment of the disclosure, a material of the enhancement layer includes a photoinitiator.

In an embodiment of the disclosure, the enhancement layer includes a filler.

In an embodiment of the disclosure, the filler includes organic particles, inorganic particles, or a combination thereof.

In an embodiment of the disclosure, the enhancement layer is an enhancement layer.

In an embodiment of the disclosure, the enhancement layer includes a dye or pigment; an optical brightener; microcapsules; a light stabilizer; a thickener; a leveling agent; or combinations thereof.

A display according to an embodiment of the disclosure includes a light guide plate, an optical adhesive, a light source element, and a display panel. The light guide substrate has a light incident surface, a first surface, and a second surface. The first surface is opposite to the second surface, and the light incident surface extends between the first surface and the second surface. The enhancement layer is disposed on the light guide substrate. A thickness of the enhancement layer is from 1 micrometer to 25 micrometers, and a first refractive index of the light guide substrate is greater than a second refractive index of the enhancement layer. The optical adhesive is disposed on the light guide substrate. The enhancement layer is interposed between the first surface of the light guide substrate and the optical adhesive. The light source element is disposed beside the light incident surface and emits light toward the light incident surface. The display panel faces the second surface of the light guide substrate.

In an embodiment of the disclosure, the enhancement layer further covers the light incident surface, and the enhancement layer is interposed between the light incident surface and the light source element.

In an embodiment of the disclosure, the enhancement layer further covers the second surface, and the enhancement layer is interposed between the second surface and the display panel.

In an embodiment of the disclosure, a third refractive index of the optical adhesive is greater than the second refractive index of the enhancement layer.

In an embodiment of the disclosure, the second refractive index of the enhancement layer is from 1.3 to 1.48.

In an embodiment of the disclosure, the display further includes a touch panel, and the touch panel is attached to the light guide plate through the optical adhesive.

Based on the above, the light source device and the display according to the embodiments of the disclosure use the light guide plate with the enhancement layer. The enhancement layer is formed on the surface of the light guide substrate by coating, and the enhancement layer is thin and does not increase the thickness of the overall device, and can achieve a planarization effect. For example, the enhancement layer may have properties such as UV resistance, water resistance, chemical resistance, scratch resistance, and so on through material selection, and may also have self-repair properties through material selection to reduce possible damage when the light guide plate is bent. In addition, the enhancement layer can be used as an intermediary layer between the light guide plate and the light source element, which helps to optically make the light provided by the light source element more uniformly distributed in the light guide plate. Therefore, the light source device and the display of the embodiments of the disclosure have ideal light emitting and display effects and have good resistance, and can be used for different applications such as flexible and non-planar products.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1A:
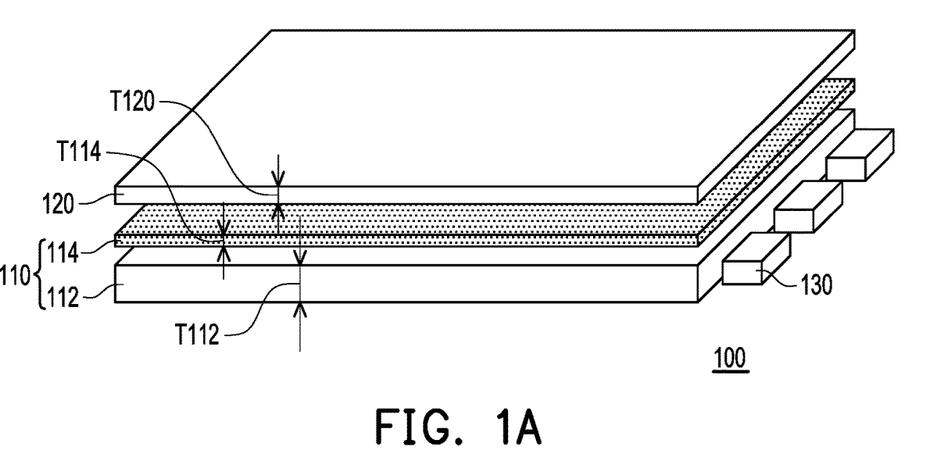
FIG. 1A is a schematic exploded view of a light source device according to an embodiment of the disclosure.
Figure 1B:
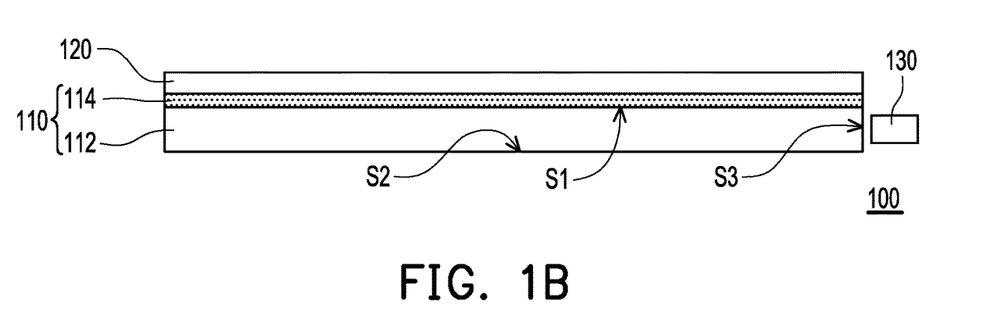
FIG. 1B is a schematic side view of the light source device in FIG. 1A.

FIG. 1A is a schematic exploded view of a light source device according to an embodiment of the disclosure, and FIG. 1B is a schematic side view of the light source device in FIG. 1A. Referring to FIG. 1A and FIG. 1B, the light source device 100 includes a light guide plate 110, an optical adhesive 120, and a light source element 130. The light guide plate 110 includes a light guide substrate 112 and an enhancement layer 114. The enhancement layer 114 is disposed on the light guide substrate 112. The optical adhesive 120 is disposed on the light guide plate 110 for attaching other elements (not shown). The light guide substrate 112 of the light guide plate 110 has a first surface S1, a second surface S2, and a light incident surface S3, wherein the first surface S1 is opposite to the second surface S2 and the light incident surface S3 extends between the first surface S1 and the second surface S2. In this embodiment, the enhancement layer 114 is interposed between the first surface S1 of the light guide substrate 112 and the optical adhesive 120. In addition, the light source element 130 is disposed beside the light incident surface S3 and emits light toward the light incident surface S3.

In some embodiments, the optical adhesive 120 (optical clear adhesive (OCA) or optical clear resin (OCR)) is a solid sheet-like adhesive material with good light transmittance, which has properties similar to those of a double-sided tape for attaching the elements above and below. In some embodiments, the thickness T120 of the optical adhesive 120 is approximately 25 micrometers to 250 micrometers. When both the optical adhesive 120 and the light guide substrate 112 are solid materials and have a certain thickness, the adhesion between them is not very stable, and they are likely to peel off from each other. In this embodiment, the enhancement layer 114 is provided between the optical adhesive 120 and the light guide substrate 112 to enhance the adhesion between the elements. Therefore, the light guide plate 110 and the optical adhesive 120 are less likely to peel off from each other, which helps to maintain the service life of the light source device 100.

In some embodiments, the light source element 130 includes a light emitting diode. For example, the light source device 100 may include a plurality of light source elements 130, and the light source elements 130 may be arranged at intervals beside the light incident surface S3 of the light guide substrate 112. The light source element 130 may be oriented with the light emitting surface facing the light incident surface S3 so as to emit light toward the light incident surface S3. The light guide plate 110 then guides the point-distributed light sources provided by the light source elements 130 into a surface light source for use in the final product (for example, as the light source for a display).

The light guide substrate 112 is, for example, a flat plate-like element. The first surface S1 and the second surface S2 refer to two surfaces which are parallel to the plane of the plate and whose normal directions are substantially parallel to each other, and the light incident surface S3 may be a part of a side surface surrounding the periphery of the flat plate. In this embodiment, the light guide substrate 112 is a rectangular flat plate, for example, and the light incident surface S3 may be one of the four side surfaces. In some embodiments, the light incident surface S3 may be two or more of the four side surfaces. That is to say, in some embodiments, the light source elements 130 may be disposed beside more than one side surface of the light guide substrate 112. Thus, any side surface corresponding to the light source element 130 or receiving the light emitted by the light source element 130 may serve as the light incident surface S3. Therefore, the aspect in which one of the side surfaces in FIG. 1A and FIG. 1B is the light incident surface S3 is only an example for illustration.

The material of the light guide substrate 112 may include polymethyl methacrylate (PMMA) or polycarbonate (PC), but not limited thereto. The thickness T112 of the light guide substrate 112 is about a few millimeters to more than ten millimeters, for example, 2 millimeters to 15 millimeters, but not limited thereto. In an embodiment, the enhancement layer 114 may be a coating enhancement layer, which is, for example, formed on the light guide substrate 112 by coating. The thickness T114 of the enhancement layer 114 may be significantly smaller than the thickness T112 of the light guide substrate 112, and the thickness T114 of the enhancement layer 114 may also be smaller than the thickness T120 of the optical adhesive 120. For example, the thickness T114 of the enhancement layer 114 is, for example, from 1 micrometer to 25 micrometers. Therefore, the enhancement layer 114 is a thin coating formed on the light guide substrate 112, and the thickness thereof is not significant to the overall light source device 100. In addition, in some embodiments, the enhancement layer 114 may have a structure through control and adjustment of the coating process. For example, the coating rate of the enhancement layer 114 may be controlled to form a thicker layer in some regions and a thinner layer in some other regions, thereby defining microstructures in the final enhancement layer 114.

Both the light guide substrate 112 and the enhancement layer 114 have good light transmittance, which allows most visible light to pass through. Therefore, the light guide plate 110 can transmit the light emitted by the light source element 130 without causing significant light loss. Furthermore, the first refractive index of the light guide substrate 112 is greater than the second refractive index of the enhancement layer 114. In this embodiment, the first refractive index of the light guide substrate 112 may be 1.58 to 1.6 (the material is PC) or 1.48 to 1.5 (the material is PMMA), and the second refractive index of the enhancement layer 114 may be from 1.3 to 1.48, but not limited thereto. The light emitted by the light source element 130 enters the light guide substrate 112 from the light incident surface S3 and then travels in the light guide substrate 112. Since the first refractive index of the light guide substrate 112 is greater than the second refractive index of the enhancement layer 114, oblique light may be totally reflected at the interface between the first surface S1 of the light guide substrate 112 and the enhancement layer 114 and travel toward the second surface S2, so as to irradiate the elements facing the second surface S2 (for example, a display panel). Thus, the light source device 100 can be applied in a display to provide the light source required by the display, and serve as a light source module.

In addition, the third refractive index of the optical adhesive 120 may be greater than the second refractive index of the enhancement layer 114, which allows the light passing through the enhancement layer 114 to pass through the optical adhesive 120 without being reflected back to the light guide plate 110, thereby improving light utilization. In some embodiments, since the enhancement layer 114 is provided between the light guide substrate 112 and the optical adhesive 120, the optical adhesive 120 is not required to use a material having a smaller refractive index, which increases the flexibility of material selection for the optical adhesive 120. For example, the third refractive index of the optical adhesive 120 may be greater than 1.45.

In some embodiments, the material of the enhancement layer 114 may be a photo-crosslinkable resin. In some embodiments, the material of the enhancement layer 114 may include a functional polymer, wherein the functional polymer may include an acrylate polymer; a block polymer; an oligomer, a polymer or a hyperbranched polymer with a fluoroacrylate resin; a silicone modified oligomer, polymer or hyperbranched polymer; an acrylated epoxy resin; acrylated urethanes; aliphatic acrylated urethanes; aromatic acrylated urethanes; or combinations of the foregoing. In some embodiments, the functional polymer of the enhancement layer 114 may account for 0 wt % to 60 wt %.

In some embodiments, the material of the enhancement layer 114 may include a functional monomer, wherein the functional monomer may be a monomer having a monofunctional group or a multifunctional group. In some embodiments, the monomer serving as the functional monomer may include a monofunctional or polyfunctional acrylate monomer; a fluoroacrylate monomer; a silicon modified acrylate monomer; or combinations of the foregoing. In some embodiments, the proportion of the functional monomer in the enhancement layer 114 may range from 10 wt % to 99 wt %.

In some embodiments, the material of the enhancement layer 114 may include a photoinitiator, wherein the photoinitiator may be single-component or multi-component. For example, the photoinitiator is one that generates free radicals upon exposure to light and reacts through the free radicals. The photoinitiator may be a hydroxyketone type photoinitiator such as Irgacure® 184 or an acylphosphine oxide type photoinitiator such as Irgacure® TPO. In some embodiments, the proportion of the photoinitiator in the enhancement layer 114 may range from 0.01 wt % to 5 wt %.

In some embodiments, the enhancement layer 114 includes fillers, wherein the fillers include organic particles, inorganic particles or combinations of the foregoing. The organic particles, for example, include silicon polymers. The inorganic particles include, for example, nano metal particles, such as nano particles made of ZnO, $TiO_2$, $SiO_2$, and $MgF_2$. In some embodiments, the material of the enhancement layer 114 may include a dye or pigment, an optical brightener, microcapsules, a light stabilizer, a thickener, a leveling agent, and other additives. The additives and/or fillers in the enhancement layer 114 may account for about 0.01 wt % to 15 wt %.

In some embodiments, the material of the enhancement layer 114 may include a solvent, or may be a solvent-free material. The solvent used to form the enhancement layer 114 may be isopropyl alcohol (IPA), alcohol (EtOH), methyl ethyl ketone (MEK), acetone, toluene, ethyl acetate (EA), tetrahydrofuran (THF), dimethylacetamide (DMAC), etc. The solvent in the enhancement layer 114 may account for about 0 wt % to 50 wt %.

The material of the enhancement layer 114 may be adjusted according to different requirements. In some embodiments, when the material of the enhancement layer 114 includes a silicone modified acrylate monomer, oligomer or polymer; or contain fillers such as silicon polymers, $SiO_2$ particles or nano metal particles, the enhancement layer 114 can have water resistance properties. In some embodiments, when the material of the enhancement layer 114 includes an acrylate monomer, oligomer or polymer; an acrylated epoxy resin or acrylated urethanes (aliphatic and aromatic); or fillers such as silicon polymers, $SiO_2$ particles or nano metal particles, the enhancement layer 114 can have good chemical resistance. In some embodiments, when the material of the enhancement layer 114 includes an acrylate monomer, oligomer or polymer; an acrylated epoxy resin; acrylated urethanes; a hyperbranched polymer; or fillers such as silicon polymers, $SiO_2$ particles or nano metal particles, the enhancement layer 114 has good scratch resistance. In some embodiments, when fillers such as nano metal or anti-UV (ultraviolet) additives are added to the material of the enhancement layer 114, the enhancement layer 114 has UV resistance. In some embodiments, when a block polymer or microcapsules are added to the material of the enhancement layer 114, the enhancement layer 114 has self-repair properties. The self-repair means that, when the enhancement layer 114 has cracks due to an external force (folding, bending, or the like; for example, the state shown in FIG. 1C and FIG. 1D), these additives can help to fill the cracks to achieve self-repair, which helps to maintain the service life of the light guide plate 110. Therefore, the light guide plate 110 has flexibility and can be applied to flexible products or curved (non-planar) surface products. However, the properties and materials described above are only examples, and the disclosure is not limited thereto.

Figure 2:
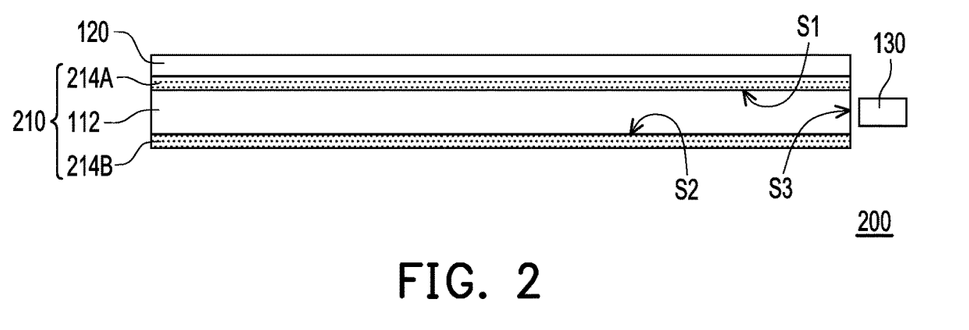
FIG. 2 is a schematic side view of a light source device according to an embodiment of the disclosure.

FIG. 2 is a schematic side view of a light source device according to an embodiment of the disclosure. In FIG. 2, the light source device 200 includes a light guide plate 210, an optical adhesive 120, and a light source element 130, wherein the light guide plate 210 includes a light guide substrate 112 and an enhancement layer 214. The optical adhesive 120, the light source element 130, and the light guide substrate 112 in FIG. 2 are substantially the same as the optical adhesive 120, the light source element 130, and the light guide substrate 112 in FIG. 1A and FIG. 1B. Therefore, the descriptions about these elements in the two embodiments can be reference for each other and be applied to each other. Specifically, this embodiment is different from the embodiment shown in FIG. 1A and FIG. 1B mainly in that, in addition to being disposed on the optical adhesive 120 and the first surface S1 of the light guide substrate 112, the enhancement layer 214 also covers the second surface S2 of the light guide substrate 112. For convenience, the parts of the enhancement layer 214 covering different surfaces are divided into a first sub-layer 214A and a second sub-layer 214B. The first sub-layer 214A covers the first surface S1 of the light guide substrate 112, and the second sub-layer 214B covers the second surface S2 of the light guide substrate 112. The first sub-layer 214A is substantially the same as the enhancement layer 114 in FIG. 1A and FIG. 1B. The materials and properties of the first sub-layer 214A and the second sub-layer 214B may be the same as those of the enhancement layer 114 in FIG. 1A and FIG. 1B. For example, the refractive index of the first sub-layer 214A and the second sub-layer 214B may be from 1.3 to 1.48, the thickness of the first sub-layer 214A and the second sub-layer 214B is from 1 micrometer to 25 micrometers, and the material of the first sub-layer 214A and the second sub-layer 214B may be selected from the materials of the enhancement layer 114 described above.

Figure 3A:
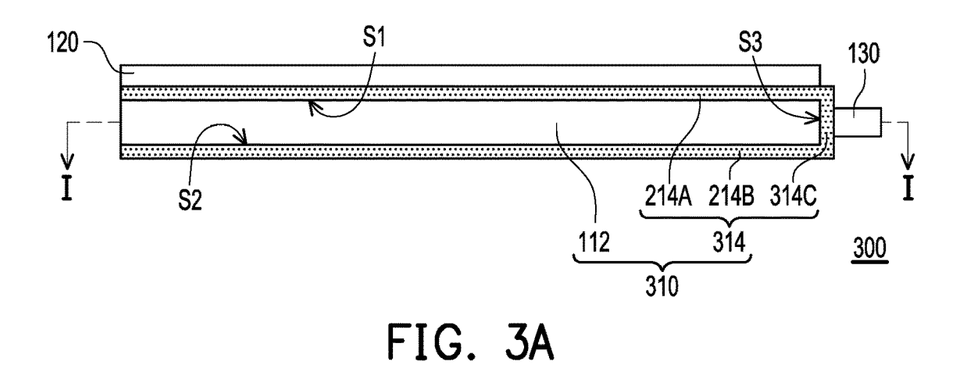
FIG. 3A is a schematic side view of a light source device according to an embodiment of the disclosure.
Figure 3B:
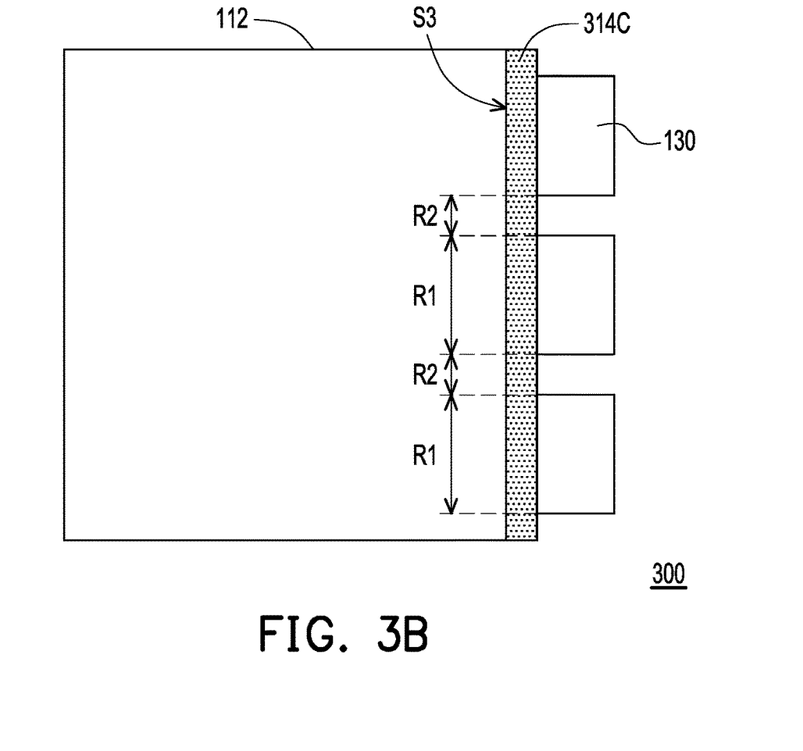
FIG. 3B is a schematic cross-sectional view of the light source device in FIG. 3A along the line I-I.

FIG. 3A is a schematic side view of a light source device according to an embodiment of the disclosure, and FIG. 3B is a schematic cross-sectional view of the light source device in FIG. 3A along the line I-I. In FIG. 3A and FIG. 3B, the light source device 300 includes a light guide plate 310, an optical adhesive 120, and a light source element 130, wherein the light guide plate 310 includes a light guide substrate 112 and an enhancement layer 314. The light source device 300 is substantially similar to the light source device 200, so the same reference numerals in the two embodiments represent the same elements, and the descriptions of the same elements in the two embodiments can be reference for each other. Specifically, the light source device 300 is different from the light source device 200 mainly in that the enhancement layer 314 also covers the light incident surface S3, so that the enhancement layer 314 is interposed between the light incident surface S3 and the light source element 130. In other words, the enhancement layer 314 includes a first sub-layer 214A covering the first surface S1, a second sub-layer 214B covering the second surface S2, and a third sub-layer 314C covering the light incident surface S3. The details of the first sub-layer 214A and the second sub-layer 214B can be found in the relevant description of FIG. 2. The third sub-layer 314C may completely cover the light incident surface S3. In some embodiments, the third sub-layer 314C may be continuously connected between the first sub-layer 214A and the second sub-layer 214B, but not limited thereto. In some embodiments, adjacent two of the first sub-layer 214A, the second sub-layer 214B, and the third sub-layer 314C may be disconnected and not continuous.

The third sub-layer 314C of the enhancement layer 314 is an intermediary layer between the light source element 130 and the light incident surface S3. The light emitted by the light source element 130 may be scattered and refracted by the third sub-layer 314C before reaching the light incident surface S3, which helps to improve the uniformity of the light before entering the light guide substrate 112. For example, as shown in FIG. 3B, the light source device 300 includes a plurality of light source elements 130, and the light source elements 130 are arranged at intervals. Therefore, the light source elements 130 do not provide a continuous light source distributed along the light incident surface S3. Specifically, the light incident surface S3 of the light guide substrate 112 includes sections R1 overlapping the light source elements 130 and sections R2 not overlapping the light source elements 130. Since the light source elements 130 are arranged at intervals, the light emitted by the light source elements 130 is mainly distributed in the sections R1, and the sections R2 receive relatively less light, which may result in an obvious difference in brightness between the section R1 and the section R2. However, in this embodiment, the third sub-layer 314C has a function of refracting and scattering light to adjust the distribution of the light emitted by the light source elements 130, so that the light can be made uniform in the third sub-layer 314C before entering the light guide substrate 112 from the light incident surface S3. As a result, the difference in brightness between the section R1 and the section R2 is reduced to achieve a more uniform light distribution. Since the refractive index of the third sub-layer 314C (same as in the description of the enhancement layer 114 in FIG. 1A and FIG. 1B) is smaller than the refractive index of the light guide substrate 112, the light is not totally reflected at the interface between the third sub-layer 314C and the light incident surface S3 and can mostly enter the light guide substrate 112 without loss. Therefore, the light source device 300 can provide a uniform light emitting effect and have ideal light utilization.

Figure 4:
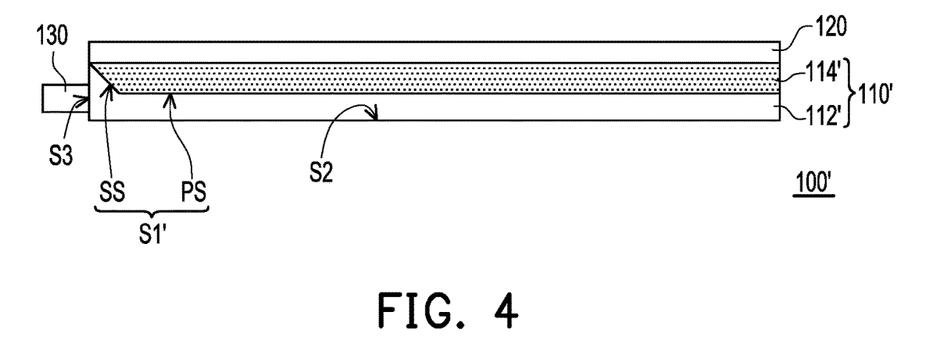
FIG. 4 is a schematic side view of a light source device according to an embodiment of the disclosure.

FIG. 4 is a schematic side view of a light source device according to an embodiment of the disclosure. In FIG. 4, the light source device 100' is substantially similar to the light source device 100 in FIG. 1A and FIG. 1B, wherein the light source device 100' includes a light guide plate 110', an optical adhesive 120, and a light source element 130. The details of the optical adhesive 120 and the light source element 130 can be found in the relevant description of FIG. 1A and FIG. 1B and will not be repeated here. In this embodiment, the light guide plate 110' is different from the light guide plate 110 in FIG. 1A and FIG. 1B mainly in that the light guide plate 110' includes a light guide substrate 112' and an enhancement layer 114', and the shape of the light guide substrate 112' is different from that of the light guide substrate 112. Specifically, the light guide substrate 112' has a first surface S1', a second surface S2, and a light incident surface S3. The enhancement layer 114' is disposed on the first surface S1', and the light source element 130 faces the light incident surface S3. The first surface S1' of the light guide substrate 112' has a slope section SS and a plane section PS, and the slope section SS is located between the light incident surface S3 and the plane section PS.

In this embodiment, the thickness of the light guide substrate 112' is kept substantially constant in the plane section PS, and gradually increases toward the light incident surface S3 in the slope section SS. Therefore, the light guide substrate 112' has a wedge-shaped structure near the light incident surface S3, and has a reduced thickness away from the light incident surface S3. In some embodiments, the thickness of the light guide substrate 112' may vary from 5 micrometers to 250 micrometers. The enhancement layer 114' is conformably disposed on the first surface S1' and also has a thickness that varies to compensate for the thickness variation of the light guide substrate 112', so that the structure of the light guide plate 110' has a substantially uniform thickness. As a result, the optical adhesive 120 can be disposed on the flat surface formed by the enhancement layer 114', which helps to ensure the stability of adhesion of the optical adhesive 120.

Figure 5:
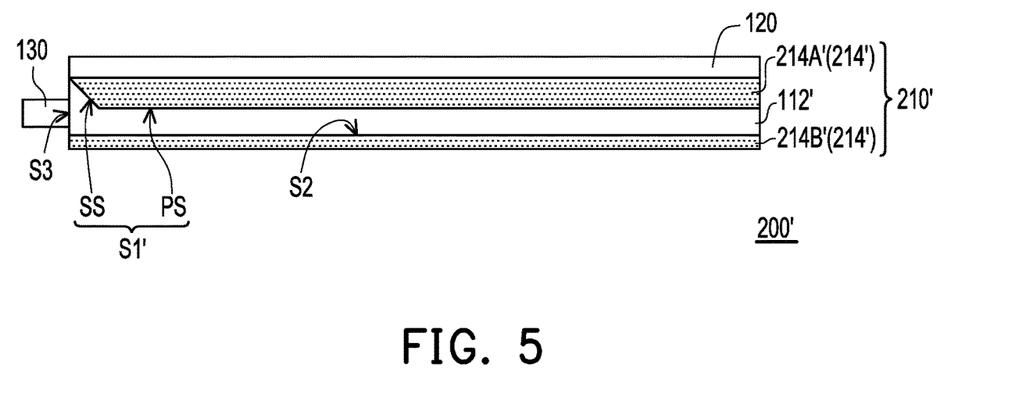
FIG. 5 is a schematic side view of a light source device according to an embodiment of the disclosure.

FIG. 5 is a schematic side view of a light source device according to an embodiment of the disclosure. In FIG. 5, the light source device 200' is substantially similar to the light source device 200 in FIG. 2, wherein the light source device 200' includes a light guide plate 210', an optical adhesive 120, and a light source element 130. The details of the optical adhesive 120 and the light source element 130 can be found in the relevant description of FIG. 1A and FIG. 1B and will not be repeated here. In this embodiment, the light guide plate 210' is different from the light guide plate 210 in FIG. 2 mainly in that the light guide plate 210' includes a light guide substrate 112' and an enhancement layer 214', and the shape of the light guide substrate 112' is different from that of the light guide substrate 112. Specifically, the light guide substrate 112' has a first surface S1', a second surface S2, and a light incident surface S3. The enhancement layer 214' includes a first sub-layer 214A' disposed on the first surface S1' and a second sub-layer 214B disposed on the second surface S2, and the light source element 130 is disposed beside the light incident surface S3 to emit light toward the light incident surface S3.

In this embodiment, the first surface S1' of the light guide substrate 112' has a slope section SS and a plane section PS, and the slope section SS is located between the light incident surface S3 and the plane section PS. The thickness of the light guide substrate 112' is kept substantially constant in the plane section PS, and gradually increases toward the light incident surface S3 in the slope section SS. Therefore, the light guide substrate 112' has a wedge-shaped structure near the light incident surface S3. The first sub-layer 214A' of the enhancement layer 214' disposed on the first surface S1' also has a thickness that varies to compensate for the thickness variation of the light guide substrate 112', so that the structure of the light guide plate 210' has a substantially uniform thickness. As a result, the optical adhesive 120 can be disposed on the flat surface formed by the first sub-layer 214A', which helps to ensure the stability of adhesion of the optical adhesive 120. In other embodiments, the light guide substrate 112' having a wedge-shaped structure and the first sub-layer 214A' having a varying thickness can be applied to the light source device 300 in FIG. 3A in place of the light guide substrate 112 and the first sub-layer 214A in FIG. 3A, which helps to thin the overall product.

Figure 6:
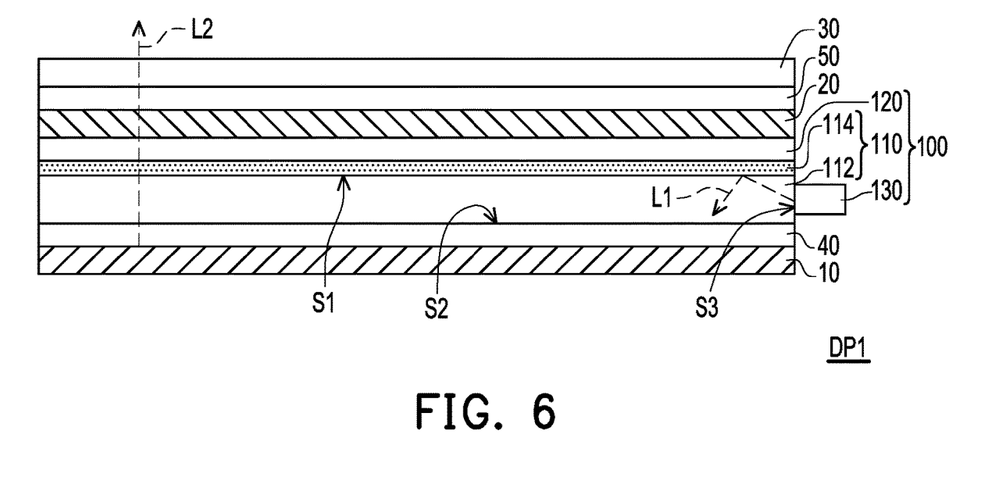
FIG. 6 is a schematic side view of a display according to an embodiment of the disclosure.

FIG. 6 is a schematic side view of a display according to an embodiment of the disclosure. In FIG. 6, the display DP1 mainly includes a light guide plate 110, an optical adhesive 120, a light source element 130, a display panel 10, a touch panel 20, a cover plate 30, and other optical adhesives 40 and 50, wherein the light guide plate 110, the optical adhesive 120, and the light source element 130 can consti- tute the light source device 100 described above. Therefore, the specific features of the light source device 100 can be found in the description of the above embodiments. The display panel 10 may be attached to the light guide plate 110 through the optical adhesive 40, the touch panel 20 may be attached to the light guide plate 110 through the optical adhesive 120, and the display panel 10 and the touch panel 20 are located on opposite two sides of the light guide plate 110. The cover plate 30 is attached to the touch panel 20 through the optical adhesive 50. The cover plate 30 is, for example, a light-transmitting plate-like element, which may have appropriate mechanical strength to protect the display DP1.

In this embodiment, the display panel 10 is, for example, a reflective display panel. When the light source provided by the light source device 100 irradiates the display panel 10, the light is reflected by the display panel 10 and passes through the light guide plate 110, the touch panel 20, and the cover plate 30, and is then emitted from the cover plate 30 to display images. Therefore, the light source device 100 is a front light source module, which is arranged between the user who watches the display screen and the display panel 10 (it can also be understood as being located in front of the display panel 10). In addition, the light guide plate 110 can uniformly provide the light emitted by the light source element 130 to the display panel 10 and allow the light reflected by the display panel 10 to pass through, thereby realizing the display function.

The light guide plate 110 includes a light guide substrate 112 and an enhancement layer 114, wherein the light guide substrate 112 has a first surface S1, a second surface S2, and a light incident surface S3, and the first surface S1 and the second surface S2 are located on opposite two sides of the light incident surface S3. The enhancement layer 114 covers the first surface S1 and is located between the light guide substrate 112 and the optical adhesive 120. The thickness of the enhancement layer 114 is from 1 micrometer to 25 micrometers, and the first refractive index of the light guide substrate 112 is greater than the second refractive index of the enhancement layer 114. Further, in some embodiments, the light guide substrate 112 and the enhancement layer 114 may be implemented by using the light guide substrate 112' and the enhancement layer 114' in FIG. 4.

The light source element 130 is disposed beside the light incident surface S3 and emits light toward the light incident surface S3. The display panel 10 faces the second surface S2 of the light guide substrate 112 and is attached to the second surface S2 of the light guide substrate 112 through the optical adhesive 40, for example. In addition, the touch panel 20 may be attached to the enhancement layer 114 on the first surface S1 of the light guide substrate 112 through the optical adhesive 120. The light emitted by the light source element 130 enters the light guide substrate 112 from the light incident surface S3 and then travels in the light guide substrate 112 to be distributed as a surface light source. For example, the light L1 obliquely irradiated on the first surface S1 may be reflected and diverted to travel toward the second surface S2 based on the relationship between the refractive indexes of the enhancement layer 114 and the light guide substrate 112 to irradiate the display panel 10. Therefore, the enhancement layer 114 helps to increase the amount of light emitted by the light source element 130 to the display panel 10, that is, to improve the light utilization of the light source device 100.

Furthermore, the light L2 reflected by the display panel 10 may sequentially pass through the light guide plate 110, the optical adhesive 120, the touch panel 20, the optical adhesive 50, and the cover plate 30 to display images. In this embodiment, the third refractive index of the optical adhesive 120 may be greater than the second refractive index of the enhancement layer 114. Therefore, the light L2 is less likely to be reflected at the interface between the optical adhesive 120 and the enhancement layer 114, which helps to efficiently transmit out the light L2 with display information and improve display contrast. In addition, the optical adhesive 120 is not required to use a material having a smaller refractive index, which helps to increase the flexibility of material selection. In some embodiments, the third refractive index of the optical adhesive 120 may be greater than 1.45.

Figure 1C:
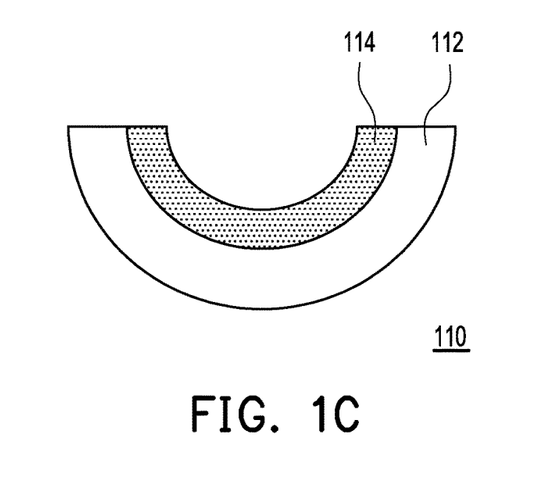
FIG. 1C and FIG. 1D schematically show a bent state of the light guide plate 110 in FIG. 1A.
Figure 1D:
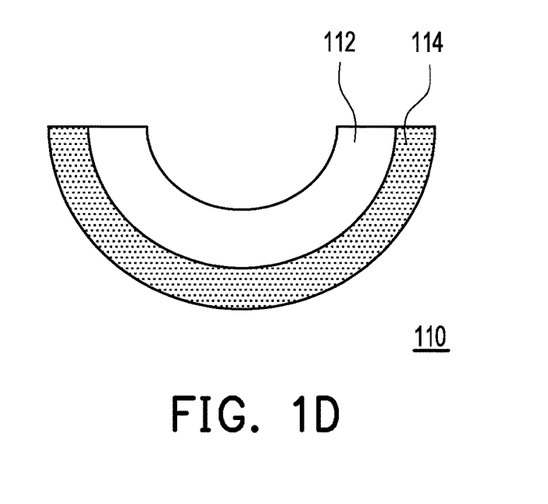

In this embodiment, the enhancement layer 114 may use the materials described in the embodiment of FIG. 1A and FIG. 1B. The enhancement layer 114 may provide various required properties through selection and formulation of different components, such as water resistance, UV resistance, chemical resistance, scratch resistance, self-repair properties, and so on. Therefore, as shown in FIG. 1C and FIG. 1D, the light guide plate 110 can be bent and can be applied to products with curved surfaces or flexible products.

Figure 7:
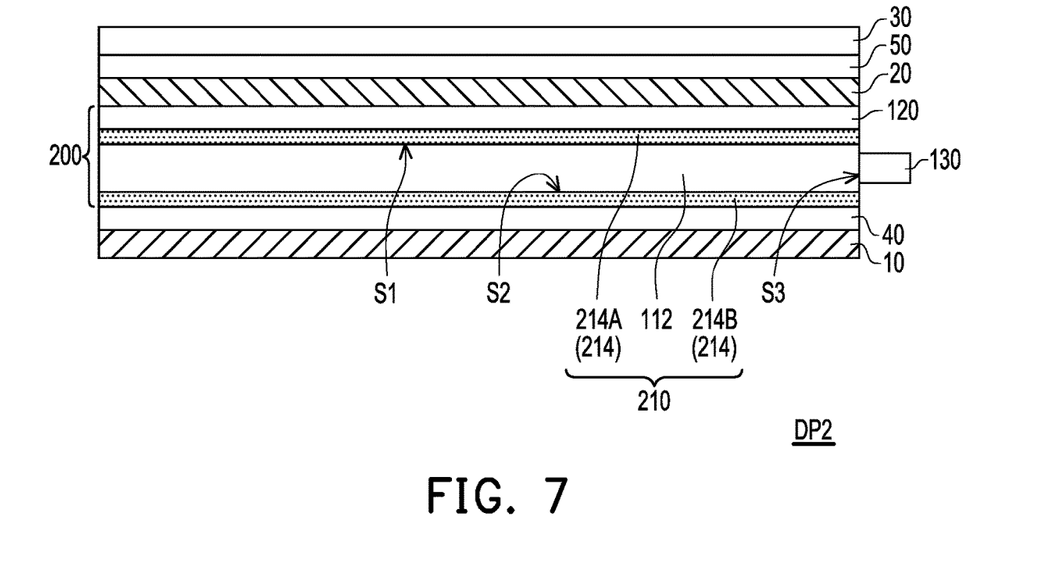
FIG. 7 is a schematic side view of a display according to an embodiment of the disclosure.

FIG. 7 is a schematic side view of a display according to an embodiment of the disclosure. In FIG. 7, the display DP2 mainly includes a light guide plate 210, an optical adhesive 120, a light source element 130, a display panel 10, a touch panel 20, a cover plate 30, and other optical adhesives 40 and 50. The display DP2 is substantially the same as the display DP1, so the descriptions of the same elements in the two embodiments can be reference for each other. Specifically, the display DP2 is different from the display DP1 in that the display DP2 uses the light source device 200 including the light guide plate 210, the optical adhesive 120, and the light source element 130 as the light source of the display panel 10. The light source device 200 is disposed between the display panel 10 and the touch panel 20. The specific structure and design of the light source device 200 can be found in the relevant description of FIG. 2 and will not be repeated here. Further, in some embodiments, the light guide plate 210 may be implemented by using the light guide plate 210' in FIG. 5. Specifically, the light guide plate 210 of the light source device 200 includes a light guide substrate 112 and an enhancement layer 214, and the enhancement layer 214 includes a first sub-layer 214A and a second sub-layer 214B covering different surfaces of the light guide substrate 112. Thus, the optical adhesive 120 for attaching the touch panel 20 to the light guide plate 210 is disposed on the first sub-layer 214A, and the optical adhesive 40 for attaching the display panel 10 to the light guide plate 210 is disposed on the second sub-layer 214B. Therefore, the enhancement layer 214 is interposed between the first surface S1 of the light guide substrate 112 and the optical adhesive 120, and is also interposed between the second surface S2 of the light guide substrate 112 and the display panel 10.

Figure 8:
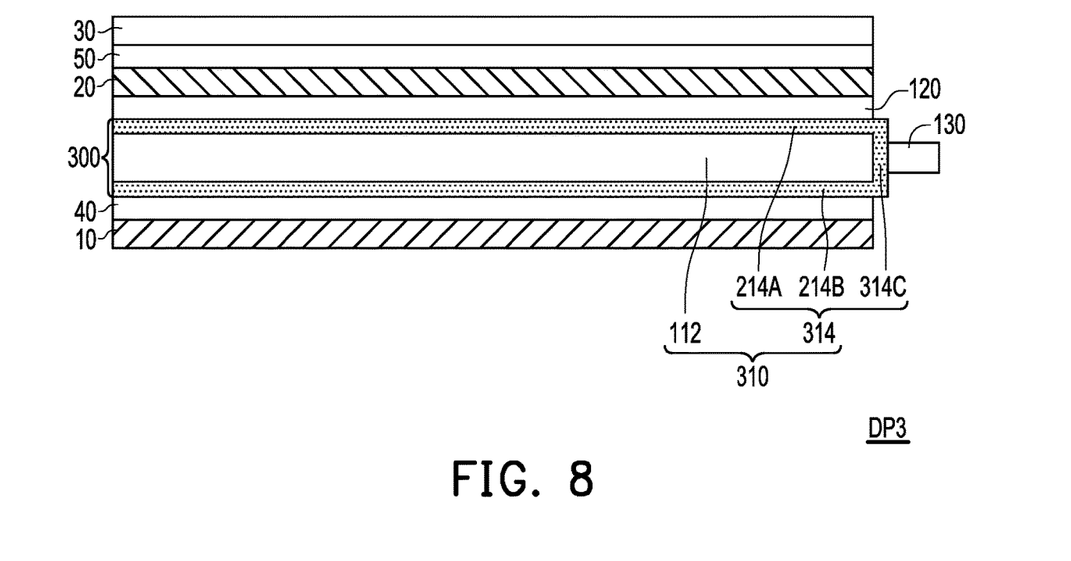
FIG. 8 is a schematic side view of a display according to an embodiment of the disclosure.

FIG. 8 is a schematic side view of a display according to an embodiment of the disclosure. In FIG. 8, the display DP3 mainly includes a light guide plate 310, an optical adhesive 120, a light source element 130, a display panel 10, a touch panel 20, a cover plate 30, and other optical adhesives 40 and 50. The display DP3 is substantially the same as the display DP1, so the descriptions of the same elements in the two embodiments can be reference for each other. Specifically, the display DP3 is different from the display DP1 in that the display DP3 uses the light source device 300 including the light guide plate 310, the optical adhesive 120, and the light source element 130 as the light source of the display panel 10. Specifically, the light source device 300 includes the light guide plate 310, the optical adhesive 120, and the light source element 130, wherein the light guide plate 310 includes a light guide substrate 112 and an enhancement layer 314, and the enhancement layer 314 includes a first sub-layer 214A covering the first surface S1, a second sub-layer 214B covering the second surface S2, and a third sub-layer 314C covering the light incident surface S3. The structure and specific design of the light source device 300 can be found in the relevant description of FIG. 3A and FIG. 3B and will not be repeated here. In addition, in some embodiments, the light guide substrate 112 may be implemented by using the light guide substrate 112' in FIG. 5.

To sum up, the light source device and the display according to the embodiments of the disclosure is provided with the light guide plate of a composite design. The light guide plate of the embodiments includes a light guide substrate and an enhancement layer. The enhancement layer can achieve different functions such as water resistance, UV resistance, chemical resistance, scratch resistance, self-repair properties, and so on through material selection. Therefore, the light guide plate of the embodiments is suitable to be applied in different products. The enhancement layer can be used as an intermediary layer between the light guide substrate and the optical adhesive, which can stabilize the bonding between the elements without increasing the thickness of the overall product. The enhancement layer can also be used as an intermediary layer between the light guide substrate and the light source element to help uniformly distribute the light emitted by the light source element in the light guide plate, which helps to improve the uniformity of light emission of the light emitting device and the display quality of the display.

What is claimed is:

1. A light source device, comprising:
a light guide plate, comprising:
a light guide substrate having a light incident surface, a first surface, and a second surface, wherein the first surface is opposite to the second surface, and the light incident surface extends between the first surface and the second surface; and
an enhancement layer disposed on the light guide substrate, wherein a thickness of the enhancement layer is from 1 micrometer to 25 micrometers, a first refractive index of the light guide substrate is greater than a second refractive index of the enhancement layer;
an optical adhesive disposed on the light guide substrate, wherein the enhancement layer is interposed between the first surface of the light guide substrate and the optical adhesive; and
a light source element disposed beside the light incident surface and emitting light toward the light incident surface, wherein the enhancement layer is a coating enhancement layer, and the enhancement layer comprises a light stabilizer.

2. The light source device according to claim 1, wherein the enhancement layer further covers the light incident surface, and the enhancement layer is interposed between the light incident surface and the light source element.

3. The light source device according to claim 1, wherein the enhancement layer further covers the second surface.

4. The light source device according to claim 1, wherein a third refractive index of the optical adhesive is greater than the second refractive index of the enhancement layer.

5. The light source device according to claim 1, wherein the second refractive index of the enhancement layer is from 1.3 to 1.48.

6. The light source device according to claim 1, wherein a material of the enhancement layer is a photo-crosslinkable resin.

7. The light source device according to claim 1, wherein a material of the enhancement layer is selected from an acrylate polymer, a block polymer, an oligomer, a polymer or a hyperbranched polymer with a fluoroacrylate resin, a silicone modified oligomer, polymer or hyperbranched polymer, an acrylated epoxy resin, acrylated urethanes, aliphatic acrylated urethanes, aromatic acrylated urethanes, or combinations thereof.

8. The light source device according to claim 1, wherein a material of the enhancement layer comprises a monomer having a monofunctional group or a multifunctional group.

9. The light source device according to claim 8, wherein the monomer is selected from a monofunctional or polyfunctional acrylate monomer, a fluoroacrylate monomer, a silicon modified acrylate monomer, or combinations thereof.

10. The light source device according to claim 1, wherein a material of the enhancement layer comprises a photoinitiator.

11. The light source device according to claim 1, wherein the enhancement layer comprises a filler.

12. The light source device according to claim 11, wherein the filler comprises organic particles, inorganic particles, or a combination thereof.

13. A display, comprising:
a light guide plate, comprising:
a light guide substrate having a light incident surface, a first surface, and a second surface, wherein the first surface is opposite to the second surface, and the light incident surface extends between the first surface and the second surface; and
an enhancement layer disposed on the light guide substrate, wherein a thickness of the enhancement layer is from 1 micrometer to 25 micrometers, a first refractive index of the light guide substrate is greater than a second refractive index of the enhancement layer;
an optical adhesive disposed on the light guide substrate, wherein the enhancement layer is interposed between the first surface of the light guide substrate and the optical adhesive;
a light source element disposed beside the light incident surface and emitting light toward the light incident surface, wherein the enhancement layer is a coating enhancement layer, and the enhancement layer comprises a light stabilizer; and
a display panel facing the second surface of the light guide substrate.

14. The display according to claim 13, wherein the enhancement layer further covers the light incident surface, and the enhancement layer is interposed between the light incident surface and the light source element.

15. The display according to claim 13, wherein the enhancement layer further covers the second surface, and the enhancement layer is interposed between the second surface and the display panel.

16. The display according to claim 13, wherein a third refractive index of the optical adhesive is greater than the second refractive index of the enhancement layer.

17. The display according to claim 13, wherein the second refractive index of the enhancement layer is from 1.3 to 1.48.

18. The display according to claim 13, further comprising a touch panel, wherein the touch panel is attached to the light guide plate through the optical adhesive.

* * * * *